Aug. 22, 1961  P. ROBINSON  2,997,635
CERAMIC CAPACITORS
Filed Sept. 17, 1957
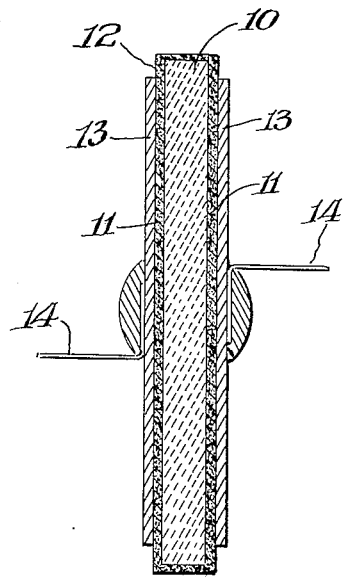
INVENTOR
PRESTON ROBINSON
BY *Connolly and Hutz*
ATTORNEY 2,997,635
CERAMIC CAPACITORS
Preston Robinson, Williamstown, Mass., assignor to Sprague Electric Company, North Adams, Mass., a corporation of Massachusetts
Filed Sept. 17, 1957, Ser. No. 684,516
5 Claims. (Cl. 317—258)

The present invention relates to ceramic dielectric material and more particularly to coating a ceramic capacitor dielectric of the titanate type.

It is an object of this invention to provide a means and method for prolonging the life of ceramic dielectrics.

It is another object of this invention to prevent the degradation of ceramic capacitor dielectrics of the titanate type during use.

It is a further object of this invention to provide a protection to the surface of a ceramic dielectric in a capacitor.

These and other objects of this invention will become more apparent upon consideration of the following description and drawing in which:

The figure shows a diametral cross section of a circular ceramic capacitor embodying this invention.

According to the present invention ceramic dielectrics, and barium titanate dielectrics in particular, show a longer service life if at least one surface of the dielectric is coated with a thin layer of a compound having a constituent with a positive valence of at least 5. In a ceramic dielectric in a capacitor there is an action which can be termed the evolution of oxygen at the anode from the body. This is accompanied by an action within the body of the ceramic which degrades the ceramic. This degradation is reflected in an alteration of the high temperature stability of the material and accordingly is an influence on the life of the ceramic and consequently the capacitor.

Ceramic dielectrics which have been found to be particularly effective in accordance with the present invention are commercial barium titanate ceramic bodies such as those containing an excess of titanium oxide in a minor amount. The ceramic composition of a mixture of ingredients and with a binder such as paraffin is pressed and fired at a temperature in the range of 2300° to 2600° F. A suitable ceramic dielectric having temperature coefficient, dielectric constant, power factor and aging characteristics meeting commercial requirements is thereby produced. The dielectric constant is greater than 1000; and in view of its longer service life, this ceramic dielectric is particularly useful in ceramic capacitors. Commercial ceramic dielectrics for ceramic capacitors are improved by the barrier compound of this invention. One such commercial ceramic may be a barium calcium titanium zirconate. This commercial body need not contain the elements in stoichiometric proportions but may contain an excess of some of the components.

According to this invention a ceramic dielectric body has incorporated into it through and on its surface a compound which contains an element having a valence state of five or more and the attribute of being capable of acquiring electrons to change to a lower valence state. The exact manner in which the addition of this compound protects the ceramic dielectric is not clear, but it is believed that they keep the titanate in the ceramic from becoming electrolytically reduced. Apparently, the compound preferentially undergoes such reduction but these reduction products appear to have no adverse effects.

The barrier compound is applied to the ceramic capacitor surface or surfaces. For example, bismuth nitrate dissolved in nitric acid may be applied to the ceramic body. Also a titanium ester or barium hydroxide in glycol may be applied and the resultant surface on the surface of the ceramic may be doped with niobium salts to provide the desired application of barrier compound on the ceramic capacitor.

Other compounds considered to be particularly adaptable to this invention are vanadyl acetate, tantalum pentoxide and osmium dioxide. In addition to these compounds certain of the salts of chromic acid may be applied to the ceramic dielectric body. The chromate salts are less useful than some of the above-noted compounds because of their solubility or partial solubility. Zinc chromate, however, does not suffer this disability and is therefore one of the more available compounds. Also available as coating compounds but more restricted in range of application are copper chromate, barium chromate and the soluble salts, stannic chromate, calcium chromate and silver chromate. Another suitable compound is platinum dioxide as well as heavy metal platinate.

The barrier compound may be present on or in the ceramic body either as a superficial coating on the surface or an impregnation of the surface layer. The application of this barrier compound in the anode area is of principal importance. However, it should be applied to a greater extent than the actual area of the anode electrode. Therefore, the surface of the ceramic body immediately adjacent to the anode electrode area receives the barrier compound with advantage. The other surfaces of the ceramic body can receive the barrier compound to produce an effect of this invention.

In the application of the barrier compound to the ceramic body there is no disadvantage to extending the application to all of the surfaces. A concentration of the metal of the barrier compound in the proportion of 0.25% of the ceramic composition by weight is the most advantageous concentration. Too high a metal concentration must be avoided. For example, with a barrier compound such as uranium acetate the concentration of the metal of the barrier compound should not exceed about 1% of the ceramic composition by weight. It is proposed that one application of the barrier compound might be achieved by the incorporation into the ceramic body from the surface of a suitable barrier compound. This incorporation would vary in percentage of concentration of the metal progressively inwardly from the surface with the highest concentrations at the surface. Thus, it would be possible to produce a distribution of barrier compound in the ceramic body which would present a maximum concentration of the metal at or on the ceramic body surface with a progressive decrease of the relative percentage to zero. There would thus be provided a preferred percentage of barrier compound in the zone of the incorporation.

The barrier compound is applied to the ceramic body by suitable means to provide a distribution, incorporation and surfacing of the barrier compound on or in the ceramic body. It is preferred that the application be effected by an in-diffusion method. As indicated above, this in-diffusion will result in a desirable gradation of concentration and a more certain attainment of the optimum ratio of metal to ceramic composition. The in-diffusing may be achieved by suitable methods to provide the proper percentage of barrier. Also the barrier compound may be evaporated on the ceramic body or applied by spraying. Any method which avoids the production of conductive glaze on the body surface will produce a zone of the barrier compound across the ceramic composition in a proper concentration, for example, 0.25% by weight of ceramic composition having a width of 0.001 inch will be satisfactory. The application of a substance from which a barrier compound can be attained could be applied to the surface and decomposed by the firing temperature of the silver anode electrode to produce the barrier compound which is received by the ceramic body. In effect the in-diffusion method encompasses any introduction and soaking in of the barrier compound.

The results of this invention may be also obtained by a coating on the ceramic body. This coating may be applied to the ceramic dielectric body after the body has been fired so as to form thereon a distinct surface coating covering the surface of the ceramic body. This application may be effected in any suitable manner such as a dip in a molten coating bath at an elevated temperature below the fusion point of the ceramic dielectric and subsequently cooling the body and coating to room temperature thereby solidifying the coating. The coating may be also applied from aqeuous or non-aqueous solution or colloidal suspension followed by drying with or without fusion to a coherent solid state.

A particularly convenient technique for applying the coatings is by dipping the dielectric in an aqueous solution that deposits the desired material upon drying. Ammonium metavanadate in a 0.5% solution in water will, for example, after a dip and a one-minute firing at 500° C. in air, form a vanadium pentoxide layer less than 0.01 mil thick. For best results the dipping and firing are repeated five or six times, to build up the coating thickness to about 0.05 mil. The final product can then have silver electrodes applied in the standard manner, firing a silver paste on as described in National Bureau of Standards, Circular 468, page 7, issued on November 15, 1957 entitled Printed Circuit Techniques, and will then show the unusual long life of the present invention. The effect is most pronounced when the dielectric is used at temperatures above 85° C., where prior art ceramics show relatively short lives.

The chromate salts set forth above provide examples of compounds requiring a variety of methods of application to the ceramic body for the formation of the barrier of this invention. For example, zinc chromate, an aqueous insoluble salt, is soluble in acids and may be applied from an aqueous solution. A further variation is presented in the application of osmium oxide which is soluble in alkalies and decomposes before melting and is best applied from an alkaline solution.

A suitable compound for application as a coating on the ceramic dielectric is vanadic pentoxide. Vanadic pentoxide powder heated to the melting point and applied to the ceramic body by a suitable method such as dipping will produce a thin coating of vanadic pentoxide on the ceramic dielectric body upon cooling.

The drawing shows a ceramic disc 10 having a zone 11 of impregnated electron capturing material such as vanadic pentoxide or uranium acetate. On each of the lateral surfaces 12 of the disc 10 there is applied an electrode 13. The electrodes 13 each are provided with a suitably attached lead 14. The electrodes 13 may be composed of a layer of silver mixed with 2% lead silicate binder, or other suitable electrode material screen printed on the disc 10 on the coating 11, or otherwise suitably applied.

The zone 11 extends across the surfaces 12 of the ceramic disc 10 underlying the electrodes and covering the area of the ceramic disc 10 adjacent the respective electrodes 13. It will be understood that the zone 11 is primarily applied so as to be present in the vinicity of the electrodes. A polarized capacitor can be made according to this invention with the zone 11 present in the surface of the ceramic disc only at the area which is in the vinicity of the cathode electrode. It is preferred to provide the zone of barrier compound in the vicinity of the anode of the capacitor.

This invention provides a ceramic capacitor made up of barium titanate which has longer life and greater thermal stability than a similar capacitor which does not have the coating of this invention.

The various embodiments of this invention described herein set forth for the purpose of illustration and it will be understood that it is intended that the scope be limited only by the appended claims.

What is claimed is:

1. A ceramic capacitor which comprises a ceramic dielectric body of the titanate type, an anode electrode on a surface of said body, a barrier of a compound containing an element of a positive valence of five or more disposed at said surface of said body including an area underlying said anode, the concentration of said element not exceeding 1% by weight of the ceramic, said element in said compound being capable of acquiring electrons to change to a lower valence state.

2. A ceramic capacitor which comprises a ceramic dielectric body of the titanate type, an anode electrode on a surface of said body, a zone of a compound containing an element of a positive valence of five or more at said surface of said body underlying said anode, the concentration of said element not exceeding 1% by weight of the ceramic, said element in said compound being capable of acquiring electrons to change to a lower valence state.

3. A ceramic capacitor which comprises a ceramic dielectric body of the titanate type, a coating of a compound on two opposed surfaces of said body, said compound containing an element of a positive valence of five or more which is readily reduced to a lower valence number, capacitor electrodes disposed on said surfaces on said body including an anode electrode, said coating covering an area greater than said anode electrode, said element not exceeding 1% by weight of the ceramic.

4. A ceramic capacitor which comprises a ceramic dielectric body of the titanate type, a zone of uranium acetate compound in a surface of said body, an electrode held against said surface, the uranium in said compound having a valence of at least five and being capable of acquiring electrons to change to a lower valence state, said uranium not exceeding 1% by weight of the ceramic.

5. A ceramic capacitor comprising a dielectric body consisting essentially of barium titanate, a surface of said body having a layer less than one mil thick of a compound having a metallic constituent with a valence of at least five and capable of change to a valence less than five, said constituent not exceeding one percent by weight of said titanate, an electrode covering less than the full area on said surface.

References Cited in the file of this patent

UNITED STATES PATENTS

| 2,317,685 | Hauser | Apr. 27, 1943 |
| 2,520,376 | Roup et al. | Aug. 29, 1950 |
| 2,758,267 | Short | Aug. 7, 1956 |

FOREIGN PATENTS

| 422,677 | Great Britain | Jan. 16, 1935 |
| 22,223 | Australia | Apr. 30, 1936 |
| 873,943 | France | July 23, 1942 |
| 203,406 | Australia | Nov. 10, 1955 |